United States Patent [19]

Fleming

[11] Patent Number: 4,491,899
[45] Date of Patent: Jan. 1, 1985

[54] VISOR COVER ASSEMBLY

[75] Inventor: Dennis J. Fleming, Holland, Mich.

[73] Assignee: Prince Corporation, Holland, Mich.

[21] Appl. No.: 464,476

[22] Filed: Feb. 7, 1983

[51] Int. Cl.³ .............................................. B60Q 1/00
[52] U.S. Cl. ...................................... 362/74; 362/135;
  362/140; 362/141; 362/155; 362/288; 362/295;
  362/370; 362/394; 296/97 B; 296/97 H; 296/97 K
[58] Field of Search .................. 362/61, 74, 135, 136,
  362/137, 140, 141, 142, 144, 155, 156, 288, 295,
  370, 394; 296/97 R, 97 H, 97 B, 97 K

[56] References Cited

U.S. PATENT DOCUMENTS

| | | | |
|---|---|---|---|
| 3,150,896 | 9/1964 | Plattner | 296/97 K |
| 4,000,404 | 12/1976 | Marcus | 296/97 H |
| 4,213,169 | 7/1980 | Kempkers | 362/141 |
| 4,227,242 | 10/1980 | Marcus | 362/137 |

Primary Examiner—Donald P. Walsh
Attorney, Agent, or Firm—Price, Heneveld, Huizenga & Cooper

[57] ABSTRACT

A vehicle visor having a mirror and cover includes a body member with one of a socket or pivot axle for receiving, in a snap-in fashion, the cover which includes the other of a socket or axle and pivotally moves with respect to the body member between closed and open positions. A tension spring extends from the body member to the cover at a position remote from the pivot axis of the cover to provide an over-center spring for alternately urging the cover toward open or closed positions. In one embodiment of the invention, the cover is employed in connection with an illuminated mirror in which the cover also has a recess for holding an electrical contact which is press-fit into the recess and includes an extending portion which engages a fixed electrical contact for applying power to lamps associated with the illuminated mirror when the cover is moved toward an open position.

18 Claims, 8 Drawing Figures

4,491,899

VISOR COVER ASSEMBLY

BACKGROUND OF THE INVENTION

The present invention relates to a cover assembly and particularly to one which can be employed in connection with a covered visor mirror.

Covered visor mirrors have been available as a popular vehicle accessory and importantly provide reduction of potential hazards with respect to glass shattering in the event of an accident when a visor is in a lowered use position. Also, when the mirror is not being employed, the closed covers eliminate stray light reflection which can cause distraction to the vehicle operator. Several visor cover pivot constructions have been proposed with U.S. Pat. Nos. 4,000,404 and 4,213,169 being illustrative. In each of these cover assemblies, bias means are provided to assure the cover will be held open when it is desired to uncover the mirror and held in a snap-closed position to securely hold the cover in the closed position. In the commercial embodiment of the visor cover construction shown in U.S. Pat. No. 4,000,404 a steel elbow serves as the pivot axle and also the attachment for the cover spring. The elbow is fitted into the plastic cover and with years of use, the plastic can creep causing the elbows to loosen rendering the cover spring inoperative. Also, with abusive use, the plastic surrounding the elbows can crack with the same undesired results. The structure of U.S. Pat. No 4,213,169 requires the repeated flexing of the plastic pivot socket and also is subject to failure after extended use. Although each of these systems have their advantages, the system of the present invention represents a significant improvement over this prior art.

SUMMARY OF THE INVENTION

The system embodying the present invention includes a body member with one of a socket or pivot axle for receiving, in a snap-in fashion, a cover which includes the other of a socket or axle and moves with respect to the body member between closed and open positions. Bias means extend from the body member to the cover at a position remote from the pivot axis of the cover to provide an over-center spring for alternately urging the cover toward open or closed positions.

In one embodiment of the present invention, the cover is employed in connection with an illuminated mirror in which the cover also has a recess for holding an electrical contact which is press-fit into the recess and includes an extending portion which engages a fixed electrical contact for applying power to lamps associated with the illuminated mirror when the cover is moved toward an open position.

These and other features, advantages and objects of the present invention will become apparent upon reading the following description thereof together with reference to the accompanying figures in which:

DETAILED DESCRIPTION OF THE PREFERRED EMBODIMENT

Figure 1:
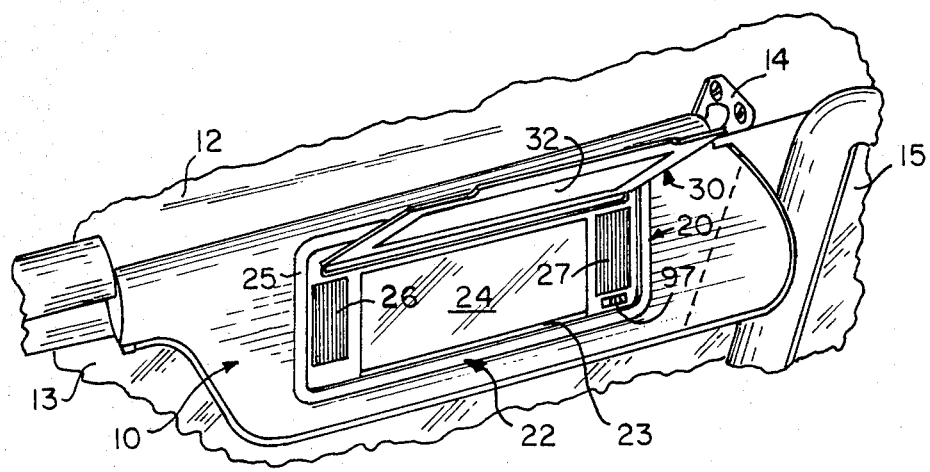
FIG. 1 is a fragmentary, perspective view of a vehicle visor including the present invention.

Referring initially to FIG. 1, there is shown a covered visor 10 incorporating the present invention and shown mounted on the right or passenger side of a vehicle. The visor comprises a visor body made of a core member injection molded of a suitable polymeric material such as polyproplene and including a central rectangular recess for receiving therein a visor mirror frame assembly 20. Typically, the visor will be covered by a suitable upholstery material textured to conform to the upholstery of the vehicle interior and is trimmed along peripheral edge, in some embodiments, by an edge bead 11. The visor includes a pivot arm extending along its top edge permitting the visor body to pivot between a stored position against the headliner 12 of the vehicle or to a lowered use position, as illustrated in FIG. 1, partially obstructing the upper edge of windshield 13 of the vehicle. The pivot rod extends outwardly from the right end, as seen in FIG. 1, terminating in a pivot mounting bracket 14 which permits the visor to pivot between the stored and use positions shown and also move to the side window 15 of the vehicle for blocking incoming light from the side. The visor body and pivot rod can be constructed in a manner disclosed in U.S. Pat. Nos. 4,000,404 and 4,075,468, the disclosures of which are incorporated herein by reference.

The visor mirror assembly 20 comprises a generally rectangular mirror frame 22 having integral top, bottom and side walls defining a central rectangular opening 23 into which there is mounted a mirror 24. The walls defining frame 22 also define a peripheral trim flange 25 surrounding and extending over the edge of the recess in the visor body when assembly 20 is mounted, as shown in FIG. 1.

On opposite sides of mirror 24, there is provided, in the preferred embodiment of the invention, a pair of light means including lenses 26 and 27 behind which there is mounted lamps 90, 92, 94 and 96 (FIG. 8) which receive electrical operating power from the vehicle's battery through switch means 70 and 80 operable upon opening of a cover 30 which pivots between an open position, shown in FIG. 1, to permit an individual to use the mirror 24 and a closed position substantially covering the mirror and lenses 26 and 27. Cover 30 is thus pivotally mounted to the visor and preferably to the mirror frame 22 near the top thereof, as described in greater detail with reference to FIGS. 2 through 4. It is to be understood that the cover is pivotally mounted to the frame at opposite ends with identical structure symmetrical to that shown and described in connection with FIGS. 2 through 4.

Figure 3:
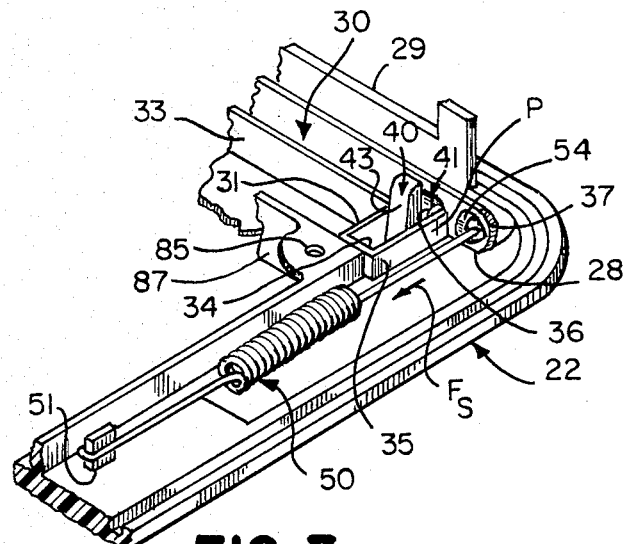
FIG. 3 is the structure shown in FIG. 2 shown with the cover in a closed position.
Figure 2:
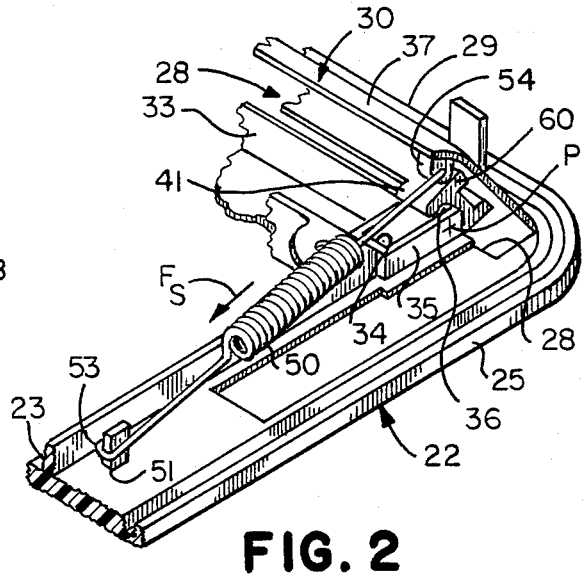
FIG. 2 is a greatly enlarged, fragmentary, perspective view of a portion of the apparatus of the present invention shown with the cover in an open position.
Figure 4:
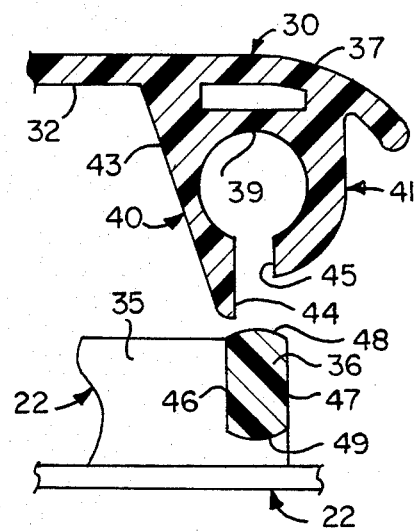
FIG. 4 is a greatly enlarged, fragmentary, cross-sectional view of one of the cover pivot mechanisms shown in an unassembled position.
Figure 5:
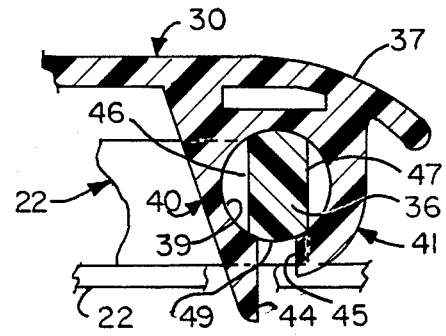
FIG. 5 is a greatly enlarged, fragmentary, cross-sectional view of one of the cover pivot mechanisms shown in an assembled position.

Shown in FIGS. 2 and 3 is the rear of the mirror frame and cover assembly, and particularly, the corner shown in the upper left in FIG. 1. The frame 22 includes a generally rectangular elongated recess or slot 28 which extends from the one side of the frame to the other and below the top wall of the frame and below a reinforcing integrally molded strut 29 extending rearwardly along one edge of opening 28. A lower reinforcing strut 33 also extends rearwardly from the face of frame 22 at the lower edge of opening 28 and terminates in an integral rectangular frame including sidewalls 31 and 35 and end wall 34 and a pivot axle 36 which extends between walls 31 and 35 at an end opposite wall 34 and lies parallel to and immediately adjacent slot 28. The opposite end of reinforcing strut 33 also terminates in a similar symmetrical configuration. The upper edge of cover 30 includes a curved end 37 defining a first wall which extends into slot 28 when the cover is opened and which integrally includes a circular socket 39 formed therein by a pair of resilient arcuate legs 40 and 41. Leg 40 includes an inclined edge 43 facilitating assembly of the cover to the frame, as described in detail below, and includes a generally semicircular inner-wall integrally formed with a similar semicircular wall of leg 41 to form the generally circular, cross section, cylindrical socket 39, as best seen in FIGS. 4 and 5. The ends 44 and 45 of legs 40 and 41, respectively, terminate in spaced relationship to one another with parallel facing surfaces defining a gap with a width slightly less than the thickness of pivot axle 36.

Axle 36 is generally circular but truncated by a pair of flat opposite surfaces 46 and 47 between rounded ends 48 and 49 having a radius of curvature substantially the same as circular socket 39. Legs 40 and 41 of cover 30 extend inwardly from the planar body 32 of the cover a distance sufficient to allow the cover to be snap-fitted into position with sockets 39 on opposite edges fitting between walls 31 and 35 in alignment over pivot axles 36 and the cover 30 substantially aligned over mirror 24 and lenses 26 and 27. The cover is assembled by snap-fitting, as illustrated in FIGS. 4 and 5, when in a position aligned with its closed position with legs 40 and 41 deflecting outwardly sufficiently for pivot axle 36 at each end of the frame to fit within the corresponding socket. The gap between edges 44 and 45 of legs 40 and 41, respectively, as illustrated in FIG. 5, is such that once inserted the cover will pivot with the surfaces 48 and 49 of the pivot axis riding smoothly and in a continuous fashion in the circular socket 39. The length of each of the pivot axles 36 is slightly greater than the width of legs 40 and 41 which in turn are narrower than the spacing between walls 31 and 35 to permit the legs to extend between sidewalls 31 and 35 of the support to permit free pivoting motion between the cover and frame. A suitable lubricant can be added to this pivot connection during assembly of the cover to the frame, if desired. The frame and cover are integrally molded of a suitable polymeric material such as polycarbonate.

In order to urge the cover between a held open position, as illustrated in FIGS. 1 and 2, and a held closed position, as shown in FIG. 3, an over-center spring is employed at each end of the cover. Each of the springs 50 is coupled to a mounting post 51 extending inwardly from the back of one of the sidewalls of frame 22 by a U-shaped end 53 of springs 50 which surrounds post 51 and securely anchors this end of the spring to the post. The opposite end of spring 50 includes a leg extending into an aperture of a mounting boss 54 integrally formed on the curved extending end 37 of cover 30 just laterally outside wall 35 supporting pivot axle 36. The coil spring 50 is installed in tension to impart a spring force $F_s$, as illustrated in FIGS. 2 and 3, to provide a cover opening force on one side of the pivot axes P of the cover, as shown in FIG. 2, for holding the cover in an open position for use, as illustrated in FIG. 1, and on the opposite side of the pivot axis P of the cover, as shown in FIG. 3, for holding the cover in a closed position. The electrical contact cooperating between the cover and frame for providing operating power to the light means is now described in conjunction with FIGS. 6 through 8.

Figure 6:
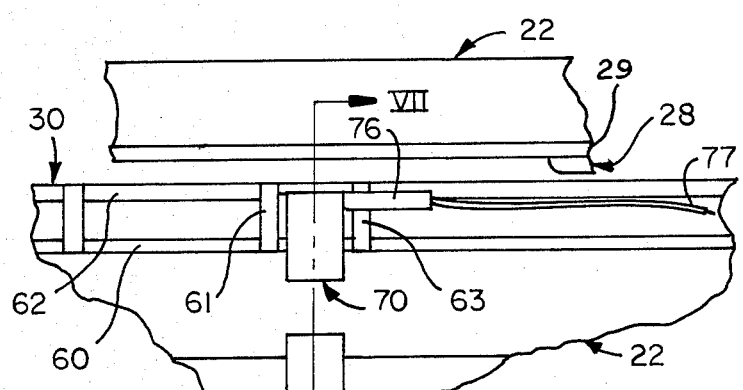
FIG. 6 is a fragmentary plan view of the electrical contact structure according to one aspect of the present invention.
Figure 7:
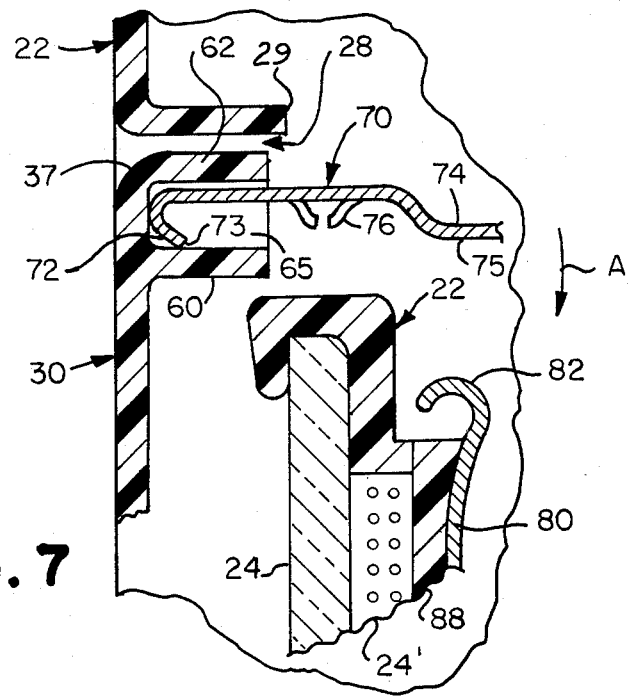
FIG. 7 is a cross-sectional view of the structure shown in FIG. 6 taken along section line VII—VII.

The curved extending edge 37 of cover 30 defines one of a pair of spaced walls 60 and 62, as seen in FIG. 6, extending substantially along the top, inside edge of cover 30 and between sockets 39. Positioned at a location spaced inwardly from one end of the cover in a pair of integrally molded lands 61 and 63 extending between walls 60 and 62 to define therebetween a rectangular recess 65 which receives and holds a first electrical contact 70. Contact 70 is made, in the preferred embodiment, of beryllium copper and has a generally rectangular configuration with one end 72 being formed in a V-shape and force-fitted between walls 60 and 62, as illustrated in FIG. 7, for securely mounting the contact therein. The open end of the V-shape has a greater width than the spacing between walls 60 and 62 such that the end 72 is compressed with inserted within recess 65. The tip 73 of end 72 engages wall 60 and effectively anchors end 72 of the contact within the recess 65 against removal. The opposite end 74 of contact 70 is generally rounded and curved in a shallow S-shape configuration with a rounded contacting surface 75 facing downwardly, as seen in FIG. 7. Approximately midway between ends 72 and 74, there is provided a wire crimp or staking terminal 76 to which there is attached an electrical conductor 77 which is coupled to the positive terminal 78 of the vehicle's battery 79 typically through a suitable inner-connecting terminal located at the instrument panel of the vehicle. Conductor 77 is trained along the channel defined by walls 60 and 62 and through the body of visor 10 and the pivot mounting bracket 14 in a conventional manner.

Figure 8:
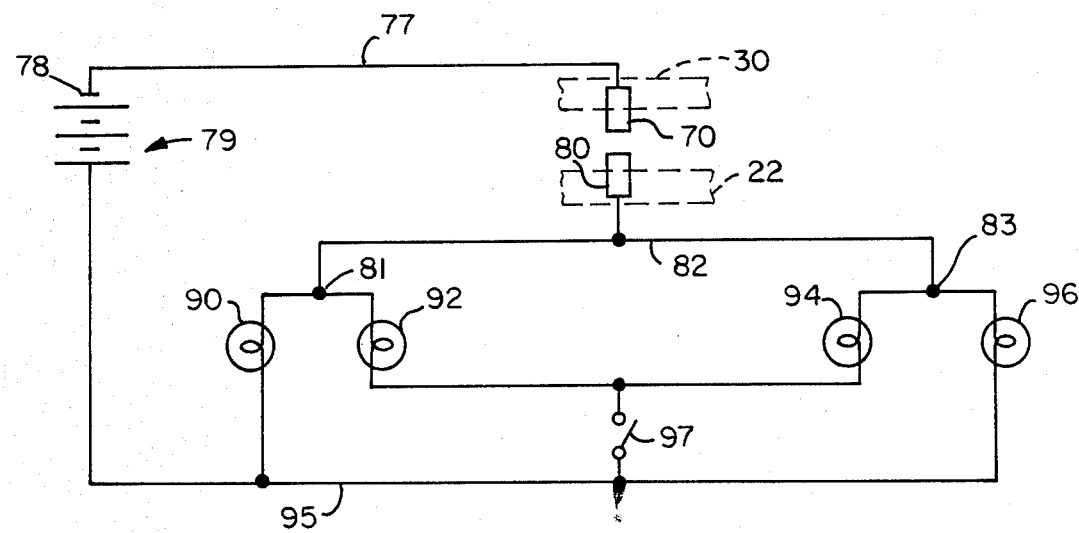
FIG. 8 is an electrical circuit diagram in schematic form of the lamp circuit.

Movable contact 70 is positioned in vertical alignment with a stationary contact 80 mounted to a polymeric chassis 88 secured to the back side of frame 22. In the preferred embodiment of the invention, a foam pad 24′ is placed behind mirror 24 and between the mirror and the polymeric chassis 85 to which contact 80 is secured. Contact 80 includes a curved end 82 which is engaged by contact surface 75 of contact 70. When cover 30 is opened, contact 70 pivots downwardly in the direction indicated by arrow A, in FIG. 7, to physically and electrically couple contacts 70 and 80. Surface 75 thereby wipes the outer surface of rounded edge 82 of contact 80 which is coupled to a supply conductor 82 (FIG. 8) for supplying operating current to electrically common terminals 81 and 83 of lamp means 90, 92, 94 and 96. Lamps 90 and 92 are positioned to be located behind lens 26 (FIG. 1) while lamps 94 and 96 are positioned behind lens 27. Lamps 90 and 96 are coupled directly to the system's common ground conductor 95 while lamps 92 and 94 are coupled to this conductor through a bright-dim single pole, single throw switch 97, also seen in FIG. 1. As can be seen in FIG. 8, when cover 30 is open, contact 70 engages contact 80 supplying electrical power immediately to lamps 90 and 96 causing their illumination and if switch 97 is in a bright position, also simultaneously illuminating lamps 92 and 94 to provide a higher level illumination as desired by the user. Contact 70 is readily fitted within recess 65 formed in the top edge of cover 30 and provides a relatively inexpensive movable contact easily assembled and which provides a stable and secure fastening of this contact to the cover.

In the preferred embodiment of the invention, the gap between facing surfaces 44 and 45 was about ⅛ of an inch while the thickness of axle 36 between sides 46 and 47 was about 9/64 of an inch. The width of legs 40 and 41 was about 3/16 of an inch while axle 36 was about ¼ of an inch. Frame 22 is secured to the body of the visor by fastening screws extending through apertures 85 (FIG. 3) at the outer corners of lens holding recesses 87 of the frame.

It will become apparent to those skilled in the art that various modifications to the preferred embodiment of the invention described herein can be made by those skilled in the art without departing from the spirit or scope thereof as defined by the appended claims.

The embodiments of the invention in which an exclusive property or privilege is claimed are defined as follows:

1. A visor cover control for a vehicle visor including a visor body, a mirror frame and a cover pivotally mounted to the frame comprising:

said mirror frame including one of a pair of spaced pivot axles or pivot sockets and said cover including the other of a pair of said pivot axles or pivot sockets, wherein said pivot sockets are shaped to cooperate with and surround said pivot axles and include an opening permitting said cover to be snap-assembled to said frame and pivot between open and closed positions; and bias means having one end coupled directly to said frame and an opposite end coupled directly to an end of said cover at a location on said cover remote from the pivot connection of said frame and cover and on a side of said pivot connection opposite the connection of said bias means to said frame for alternately urging said cover between fully closed and fully open positions as said cover is manually moved toward such positions and for holding said cover in such positions.

2. The apparatus as defined in claim 1 wherein said frame is generally rectangular and integrally includes upper and lower legs joined at opposite ends to side legs and wherein each of said side legs includes means spaced from said top leg for holding one end of said bias means.

3. The apparatus as defined in claim 2 wherein said bias means comprises an elongated tension spring.

4. The apparatus as defined in claim 3 wherein said cover is pivotally mounted to said frame near the junction of each of said side legs to said top leg and said cover includes a boss secured to said end extending beyond said pivot connection toward said top leg and wherein said tension spring has an end opposite said one end which is coupled to said boss.

5. The apparatus as defined in claim 4 and including a second spring and wherein said cover includes a boss at each edge of said extending end for receiving and holding an opposite end of each of said springs.

6. The apparatus as defined in claim 1 wherein said pivot axles are integrally formed on said frame and said pivot sockets are integrally formed on said cover.

7. The apparatus as defined in claim 6 wherein said pivot sockets and said pivot axles are generally cylindrical with said axles truncated at opposite sides to permit insertion into said sockets and wherein said sockets are made of a resilient material with said opening having a dimension slightly smaller than the distance between said opposite sides of said pivot axles to captively hold said pivot axles once inserted.

8. In a visor assembly for a vehicle including an illuminated covered mirror with a visor body and a cover movably mounted with respect to said body between an open mirror uncovered position and a closed mirror covered position an improved electrical contact assembly comprising:

said cover including a pair of spaced wall means defining a recess therebetween, a first electrical contact having one end press-fit into said recess for holding said contact to said cover, said first contact further including means for supplying electrical power thereto and a contact end opposite said one end and extending outwardly from said recess, a second electrical contact mounted to said visor assembly to be engaged by said first contact when said cover is moved from a closed position; and illumination means coupled to said second contact to receive operating power therefrom when said cover is moved from the closed position.

9. The apparatus as defined in claim 8 wherein said one end of said first contact is V-shaped with its widest portion having a dimension greater than the spacing between said wall means to compress said one end when inserted within said recess.

10. The apparatus as defined in claim 9 wherein said contact end of said first contact is a rounded extension of one leg of said V-shaped end.

11. The apparatus as defined in claim 10 wherein the other leg of said V-shaped end engages one of said wall means defining said recess to anchor said first contact to said cover.

12. The apparatus as defined in claim 11 wherein said means for supplying electrical power to said first contact comprises a staking terminal integrally formed on said first contact between said first and contact ends thereof.

13. A visor assembly for a vehicle including an illuminated covered mirror with a visor body and a cover movably mounted with respect to said body between an open mirror uncovered position and a closed mirror covered position comprising:

pivot socket means located on one of said cover or body and having a pair of resilient arcuate legs extending from said cover or body and terminating in spaced apart facing surfaces;

pivot axle means located on the other of said cover or body to align with said pivot socket means and having a generally cylindrical cross section truncated at opposite sides to define flattened sides spaced apart a distance greater than the spacing of said facing surfaces of said pivot socket means whereby said cover can be snap-inserted into said body and pivotally move between an open and a closed mirror covering position;

bias means coupled to said cover at a position spaced from the pivot connection of said cover and body and to said body at a location on a side of the pivot connection opposite its coupling to said cover for alternately urging said cover toward open or closed positions as the cover is manually moved toward such positions;

said cover including a pair of spaced wall means defining a recess therebetween, a first electrical contact having one end press-fit into said recess for holding said contact to said cover, said first contact further including means for supplying electrical power thereto and a contact end opposite said one end and extending outwardly from said recess, a second electrical contact mounted to said visor assembly to be engaged by said first contact when said cover is moved from a closed position; and illumination means coupled to said second contact to receive operating power therefrom when said cover is moved from the closed position.

14. The apparatus as defined in claim 13 wherein said body includes a mirror frame and one of said pivot socket or axle is formed on said frame and said bias means extends between said cover and frame.

15. The apparatus as defined in claim 14 wherein said one end of said first contact is V-shaped with its widest portion having a dimension greater than the spacing between said wall means to compress said one end when inserted within said recess.

16. The apparatus as defined in claim 15 wherein said contact end of said first contact is a rounded extension of one leg of said V-shaped end.

17. The apparatus as defined in claim 16 wherein the other leg of said V-shaped end engages one of said wall means defining said recess to anchor said first contact to said cover.

18. The apparatus as defined in claim 17 wherein said means for supplying electrical power to said first contact comprises a staking terminal integrally formed on said first contact between said first and contact ends thereof.

* * * * *